United States Patent
Thompson (10) Patent No.: US 9,517,834 B2
(45) Date of Patent: Dec. 13, 2016

(54) INTERFACE FOR CONTROL OF A FOLDABLE WING ON AN AIRCRAFT

(71) Applicant: AIRBUS OPERATIONS LIMITED, Bristol (GB)

(72) Inventor: Robert Ian Thompson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 0 days.

(21) Appl. No.: 14/866,251

(22) Filed: Sep. 25, 2015

(65) Prior Publication Data

US 2016/0090170 A1    Mar. 31, 2016

(30) Foreign Application Priority Data

Sep. 29, 2014    (GB) .................................... 1417175.5

(51) Int. Cl.
*B64C 3/56* (2006.01)
*B64D 45/00* (2006.01)

(52) U.S. Cl.
CPC ............. *B64C 3/56* (2013.01); *B64D 45/0005* (2013.01)

(58) Field of Classification Search
CPC ............... B64C 3/56; B64C 9/00; B64C 27/50
USPC .............................. 701/3; 244/49, 129.1, 218
See application file for complete search history.

(56) References Cited

U.S. PATENT DOCUMENTS

| | | |
|---|---|---|
| 5,381,986 A | 1/1995 | Smith et al. |
| D647,128 S | 10/2011 | Lewis et al. |
| 9,296,469 B2 * | 3/2016 | Santini ...................... B64C 3/56 |
| 9,296,472 B2 * | 3/2016 | Thoreen .................. B64C 13/04 |
| 2010/0030408 A1 | 2/2010 | Khatwa et al. |
| 2010/0051742 A1 | 3/2010 | Schweighart et al. |
| 2010/0084516 A1 * | 4/2010 | Eberhardt ................. B64C 3/54 244/218 |
| 2012/0032023 A1 | 2/2012 | Bousfield et al. |

(Continued)

FOREIGN PATENT DOCUMENTS

| | | |
|---|---|---|
| CN | 103612743 A | 3/2014 |
| EP | 1531126 A1 | 5/2005 |

(Continued)

OTHER PUBLICATIONS

European Search Report dated Jan. 27, 2016 EP Application No. 15185370.

(Continued)

*Primary Examiner* — Thomas G Black
*Assistant Examiner* — Luke Huynh
(74) *Attorney, Agent, or Firm* — Hauptman Ham, LLP (57) ABSTRACT

An aircraft comprises a foldable wing, the wing comprising an inner region and an outer region, such as a wing tip. The outer region is moveable relative to the inner region between a flight configuration and a ground configuration in which the span is reduced. The aircraft comprises a control system and a control interface. The control interface comprises a selector for selecting the desired configuration of the outer region, and is arrange to provide: a first output, such as a light, when the flight configuration is selected and the outer region is in the flight configuration; a second output, such an amber light, when the ground configuration is selected and the outer region is in the ground configuration; and a third output, such as a red light, when the outer region is not in the selected configuration.

23 Claims, 11 Drawing Sheets

(56) References Cited

U.S. PATENT DOCUMENTS

2014/0014768 A1    1/2014  Lassen et al.
2014/0084106 A1    3/2014  Eglin
2015/0108283 A1    4/2015  Thoreen et al.
2015/0298793 A1*  10/2015  Fox ..................... B64C 23/065
                                                            244/49

FOREIGN PATENT DOCUMENTS

EP         2730500  A2    5/2014
EP         2862797  A1    4/2015
GB          447577  A     5/1936

OTHER PUBLICATIONS

XB-70 Center Flight Control Panel Photograph, Dayton, Ohio, USA, at Wright-Patterson Air Force Base.

* cited by examiner

INTERFACE FOR CONTROL OF A FOLDABLE WING ON AN AIRCRAFT

RELATED APPLICATIONS

The present application claims priority from Great Britain Application Number 1417175.5, filed Sep. 29, 2014, the disclosure of which is hereby incorporated by reference herein in its entirety.

BACKGROUND OF THE INVENTION

The present invention relates to an interface for use on an aircraft having a foldable wing, and to an aircraft comprising such an interface. More particularly, but not exclusively, this invention concerns an aircraft comprising a foldable wing, a control system arranged to control movement of the foldable wing, and a control interface for interfacing with the control system. The invention also concerns a control interface for interfacing with a control system for controlling movement of a foldable wing.

There is a trend towards increasingly large passenger aircraft with higher performance efficiency (for example fuel burn reduction), for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

To solve this problem, it is known to provide a passenger aircraft with foldable wings. The foldable wing typically comprises an inner region and an outer region, the outer region being moveable relative to the inner region between: a) a flight configuration for use during flight, and b) a ground configuration for use during ground-based operations. In the ground configuration the outer region is moved (typically rotated) relative to the inner region such that the span of the wing is reduced. Thus the aircraft is able to still adhere to airport operating rules, yet benefit from the larger span in flight.

US 2014/0014768 describes an aircraft having a foldable wing tip. It also describes a control system for controlling the folding wing, and a control interface for interfacing with the control system. US 2014/0014768 describes a warning system for warning when the wingtips are not in a proper position based on the status of the aircraft, and the possibility of displaying the wingtip status, latch status, lock status and/or actuator status.

A problem with known control interfaces for folding wings is that they tend to be unduly complex and it can be difficult for the pilot to clearly determine the information being conveyed. Furthermore, some control interfaces suffer from being insufficiently intuitive and may not be very ergonomic; for example, it may be difficult for the pilot to readily determine the configuration of the wing tips and/or how to actuate the wing tips between the flight and ground configuration.

The present invention seeks to mitigate the above-mentioned problems. Alternatively or additionally, the present invention seeks to provide an improved control interface for a foldable wing on an aircraft.

SUMMARY OF THE INVENTION

According to a first aspect of the invention there is provided an aircraft comprising a foldable wing, the wing comprising an inner region and an outer region, the outer region being moveable relative to the inner region between: a) a flight configuration for use during flight, and b) a ground configuration for use during ground-based operations, in which ground configuration the outer region is moved relative to the inner region such that the span of the wing is reduced, wherein the aircraft further comprises a control system arranged to control movement of the outer region between the flight configuration and the ground configuration, and a control interface for interfacing with the control system, the control interface comprising a selector for selecting the desired configuration of the outer region, and the control interface being arrange to provide: a first output when the flight configuration is selected and the outer region is in the flight configuration; a second output when the ground configuration is selected and the outer region is in the ground configuration; and a third output when the outer region is not in the selected configuration.

By having the control interface arranged to provide three outputs that are each dependent on a comparison of the actual configuration with the selected configuration, a pilot can easily identify the status of the outer region. For example, if the first or second outputs are provided, the pilot knows that the outer region is in the respective selected configuration, whereas if the control interface provides the third output, the pilot will be alerted that the outer region is not (yet) in the selected configuration. This is thought to convey the key information in a particularly straightforward and intuitive manner.

The first, second and/or third outputs may comprise an audio signal. The audio signal may be provided in response to an additional criteria being met. The additional criteria may be representative of a forthcoming (possibly urgent) need to be in the flight configuration (for example if some steps preceding take-off have started). The additional criteria may, for example, be a detection that: the throttles are advanced; the speed has exceeded a predetermined threshold, and/or the flaps have been set. The additional criteria may be representative of a forthcoming (possibly urgent) need to be in the ground configuration (for example during taxiing-in after landing). The additional criteria may, for example, be a detection that: the speed has fallen below a predetermined threshold, or the flaps have been commanded to retract. Having the audio signal of the output(s) being generated in response to such an additional criteria being met, may be beneficial because the audio warning will tend to only be made in exceptional circumstances, and is therefore likely to be promptly registered by the pilot. Most preferably only the third output comprises an audio signal. This is thought to be advantageous because it alerts the pilot in a different manner to the first and second outputs, and more clearly indicates that the outer region is not in the selected configuration.

The control interface may comprise a display for indicating the status of the outer region. The control interface may be configured such that the display shows the first output as a first indicating signal. The control interface may be configured such that the display shows the second output as a second indicating signal. The first indicating signal may comprise a light having a first colour. The second indicating signal may comprise a light having a second colour.

The control interface may be configured such that the display shows the third output as a third indicating signal. The third indicating signal may comprise a light having a third colour. The third indicating signal may be a flashing light. The first, second and/or third outputs may comprise both the respective indicating signal and an audio output.

The control interface is preferably in the aircraft cockpit. The control interface is preferably located such that a pilot in the cockpit can effect movement of the selector to select the desired configuration of the outer region. The selector may be located along the centre of the cockpit, such that the selector is accessible by a pilot and co-pilot. The control interface may be distributed within the cockpit. For example, in embodiments comprising a display, the display may be in a different location to the selector. However, in preferred embodiments of the invention, the selector is associated with, and proximate to, the display. The control interface preferably comprises only one selector.

In some embodiments of the invention, the display may comprise a plurality of sub-displays. The sub-displays are preferably duplicates of each other. The display is preferably located in the line-of-sight of the pilot.

In the flight configuration, the outer region may be locked in position by a flight lock. The control system may comprise a lock-sensing system, the lock-sensing system being arranged to sense when the outer region is locked in position by the flight lock. The lock-sensing system may be arranged to sense a plurality of parameters to ensure the outer region is actually locked in position. For example, the lock sensing system may be arranged to sense both the movement of a latch member, and the engagement of that latch member with a latch-engaging member. Such an arrangement is preferred from an airworthiness perspective.

The control interface may be arranged to provide the first output in response to the lock-sensing system sensing when the outer region is locked in position by the flight lock. Such an arrangement is beneficial because it ensures that the first output not provided until the outer region is safely locked in the correct position.

In the ground configuration, the outer region may be locked in position by a ground lock. A, or the, lock-sensing system may be arranged to sense when the outer region is locked in position by the ground lock.

The control interface may be arranged to provide the second output in response to the lock-sensing system sensing when the outer region is locked in position by the ground lock. Such an arrangement is beneficial because it ensures that the second output not provided until the outer region is safely locked in the correct position. The lock-sensing system may be arranged to sense a plurality of parameters to ensure the outer region is actually locked in position.

The selector may be moveable in a first direction to select the ground configuration. The selector may be moveable in a second direction, preferably opposite to the first direction, to select the flight configuration. The first direction may be representative of the direction of movement of the outer region when moving from the flight configuration to the ground configuration. For example, the first direction may be a counter-clockwise rotation. The selector may be arranged to provide tactile feedback to indicate the selection of the ground and flight configurations.

The selector may be biased into the orientations for ground and flight configurations such that the selector provides positive feedback when either of these are selected.

The control system may be arranged such that, during flight, the selector is incapable of de-selecting the flight configuration. During flight, the selector may be incapable of selecting the ground configuration. The control system may be arranged to receive a signal that the aircraft is in flight (for example in response to the throttle position/movement and/or a detection of the weight on the landing gear wheels (i.e. WoW signal)). The control system may render the selector incapable of de-selecting the flight configuration in response to said signal.

The selector may comprise a knob. The selector may comprise protrusions representative of the outer regions of the aircraft wings, the orientation of the protrusions when the selector has selected the flight configuration being representative of the orientation of the outer region in the flight configuration, and the orientation of the protrusions when the selector has selected the ground configuration being representative of the orientation of the outer region in the ground configuration.

The outer region is any region of the wing outboard of the inner region. In some embodiments of the invention the outer region may be a wing tip extension; for example the outer region may be a planar tip extension. The outer region may comprise, or consist of, a wing tip device (for example a winglet). In the flight configuration the trailing edge of the outer region is preferably a continuation of the trailing edge of the inner region. The leading edge of the outer region is preferably a continuation of the leading edge of the inner region. There is preferably a smooth transition from the inner to the outer region. It will be appreciated that there may be a smooth transition, even where there are changes in sweep or twist at the junction between the inner and outer regions. However, there are preferably no discontinuities at the junction between the inner and outer regions. The upper and the lower surfaces of the outer region may be continuations of the upper and lower surfaces of the inner region. The inner region may be referred to as a fixed wing, and the outer region may be referred to as a wing tip device.

In the ground configuration, the outer region may be unsuitable for flight. For example, the outer region may be aerodynamically and/or structurally unsuitable for flight in the ground configuration. The aircraft is preferably configured such that, during flight, the outer region is not moveable to the ground configuration. The aircraft may comprise a sensor for sensing when the aircraft is in flight. When the sensor senses that the aircraft is in flight, the control system is preferably arranged to disable the possibility of moving the outer region to the ground configuration.

The outer region is moveable relative to the inner region. The outer region is preferably rotatable relative to the inner region. In principle the axis/axes of rotation may have any orientation that results in the span of the aircraft being reduced in the ground configuration. It will be appreciated that a foldable wing is a wing in which the inner and outer regions are moveable relative to one another. This may be along a fold-line, but may also encompass arrangements in which the outer region is swung, translated, or otherwise moved to reduce the span.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may comprise wing-mounted, and preferably underwing, engines.

The outer region of the wing preferably does not comprise any control surfaces. Having such an outer region is beneficial because it does not require any infrastructure for operating the control surface (which may otherwise be unduly complicated since the outer region is moveable between the flight and ground configurations).

According to another aspect of the invention, there is provided a control interface for interfacing with a control system for controlling movement of a foldable wing. The foldable wing may comprise an inner region and an outer region, the outer region being moveable relative to the inner region between: a) a flight configuration for use during flight, and b) a ground configuration for use during ground-based operations, in which ground configuration the outer region is rotated relative to the inner region such that the span of the wing is reduced. The control interface may comprise a selector for selecting the desired configuration of the outer region, and the control interface may be arrange to provide: a first output when the flight configuration is selected and the outer region is in the flight configuration; a second output when the ground configuration is selected and the outer region is in the ground configuration; and a third output when the outer region is not in the selected configuration. The first, second and third outputs are all different to each other.

The control system may comprise a lock-sensing system for sensing whether the outer region is locked in position. The control interface may comprise a receiver for receiving signals from the lock-sensing system. The control interface may be arranged to provide the first output in response to the receiver receiving a signal from the lock-sensing system indicative of the outer region being locked in position by a flight lock. The control interface may be arranged to provide the second output in response to the receiver receiving a signal from the lock-sensing system indicative of the outer region being locked in position by a ground lock.

According to yet another aspect there is provided a control interface for interfacing with a control system for controlling movement of a foldable wing, wherein the foldable wing comprises an inner region and a wing tip, the wing tip being moveable relative to the inner region between: a) a flight configuration for use during flight, and b) a ground configuration for use during ground-based operations, in which ground configuration the wing tip is rotated relative to the inner region such that the span of the wing is reduced, and wherein the control interface comprises a selector for rotating to select the desired configuration of the wing tip, and the control interface is arrange to provide: a display showing a representation of the aircraft wing and the configuration of the wing tip, an illuminated signal of a first colour on the display when the flight configuration is selected and the outer region is in the flight configuration; an illuminated signal of a second colour on the display when the ground configuration is selected and the outer region is in the ground configuration; and a flashing illuminated signal of a third colour on the display when the outer region is not in the selected configuration.

It will of course be appreciated that features described in relation to one aspect of the present invention may be incorporated into other aspects of the present invention. For example, the first aspect of the invention may incorporate any of the features described with reference to the other aspects of the invention and vice versa.

DESCRIPTION OF THE DRAWINGS

Embodiments of the present invention will now be described by way of example only with reference to the accompanying schematic drawings of which.

DETAILED DESCRIPTION

Figure 1:
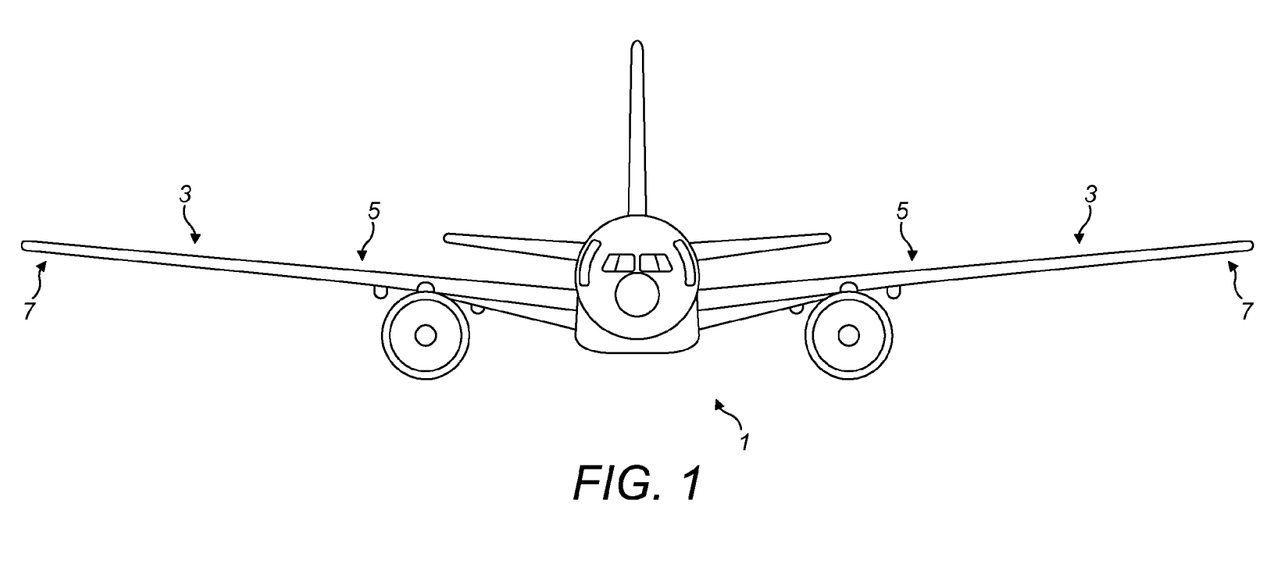
FIG. 1 is a front view of an aircraft according to a first embodiment of the invention, with the outer region of the wing in a flight configuration.

FIG. 1 is a front view of an aircraft 1 according to a first embodiment of the invention. The aircraft 1 has two wings 3. Each wing 3 comprises an inner region 5 and an outer region 7. The inner region 5 extends from the wing root to a junction with the outer region 7. The outer region 7 is in the form of a planar tip extension. Other embodiments of the invention (not shown) incorporate other types of outer region, for example incorporating wing tip devices such as winglets.

The tip extension 7 is mounted along a hinge line (not shown in FIG. 1) at the junction with the inner region, and is rotatable about that hinge between a flight configuration (shown in FIGS. 1 and 2) and a ground configuration (described with reference to FIGS. 3 to 5). In the ground configuration the wing tip extension 7 is rotated upwardly, thereby reducing the span of the aircraft 1. This enables the aircraft 1 (with the wing tip extension in the ground configuration) to meet existing airport gate limits (and other airport limitations such as runway/taxiway separations, clearances to obstacles and location of stopping/holding points) yet have a relatively large span during flight (with the wing tip extension in the flight configuration).

Aircraft with moveable wing tips are known per se. However, there remains a need for an intuitive and ergonomic interface for controlling movement of the wing tips. The aircraft 1 according to the first embodiment of the invention comprises a control system 13 (see FIG. 6) arranged to control movement of the outer region 7 between the flight configuration and the ground configuration, and a control interface 15 (see FIGS. 2 to 5c) for interfacing with the control system 13. The control system 13 is described herein primarily with reference to FIGS. 6 and 7 below, and the control interface 15 is described herein primarily with reference to FIGS. 2 to 5c below.

The control system 13 (shown in FIG. 6 and described in more detail in due course) comprises a lock-sensing system 45 for sensing whether the wing tip extension 7 is locked in position. The control system 13 is configured to output data on lock status (i.e. locked or unlocked) to the control interface 15.

The control interface 15 is shown in FIGS. 2 to 5c and comprises a display 17 showing graphical representation of the aircraft wings 3 and a graphical representation of the wing tip extension 7 in both the flight and ground configurations. The control interface 15 also comprises a selector 19 having a central knob 21 from which two diametrically opposite tabs 23 extend. The selector 19 is arranged to select the desired configuration of the wing tip extension 7. The control interface 15 sends a control signal to the control system dependent on the orientation of the selector 19, such that the control system will effect movement of the wing tip extension 7 depending on the orientation of the selector 19.

Figure 2:
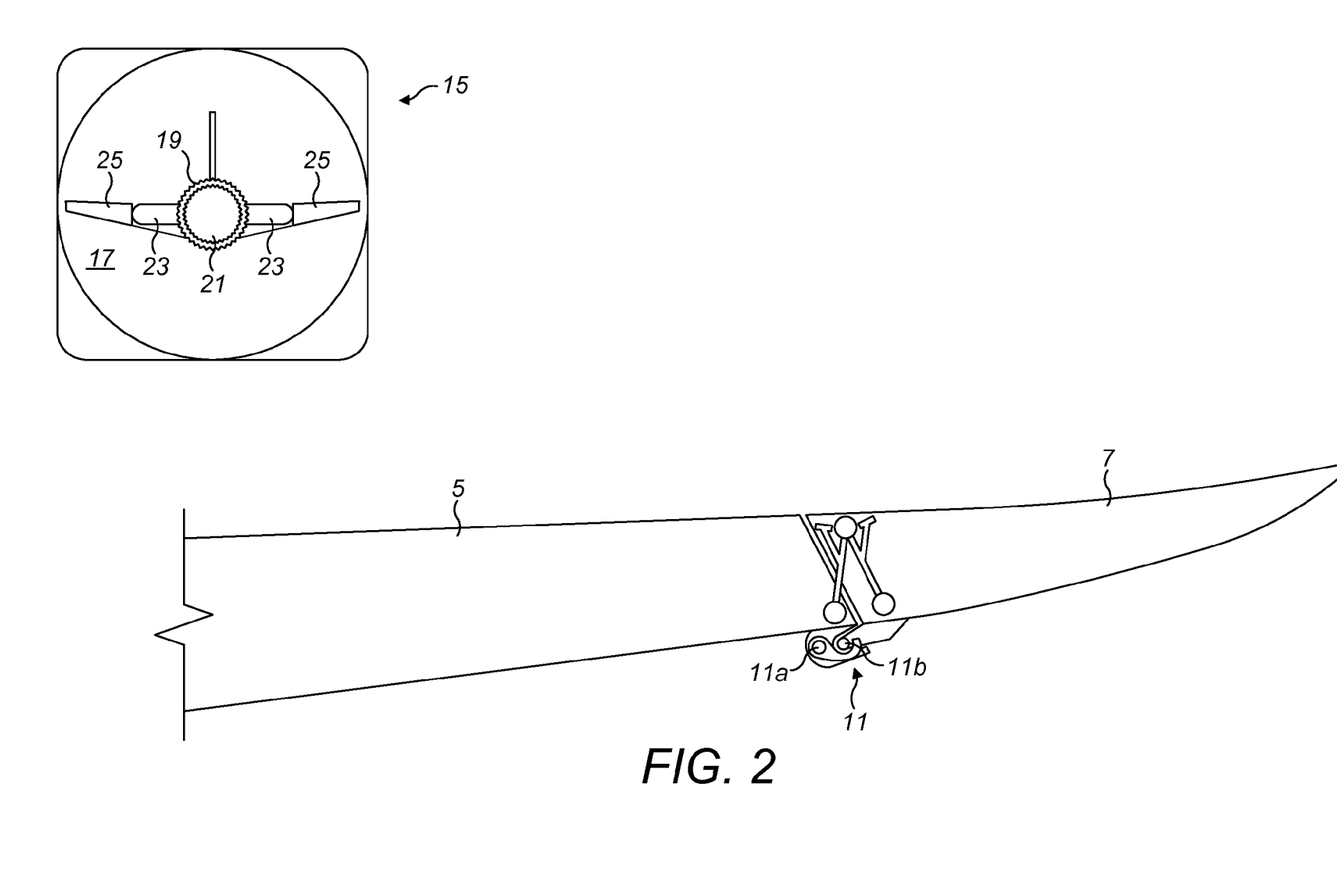
FIG. 2 is a schematic view of the inner and outer regions of the wing of the aircraft of FIG. 1, with the outer region in a flight configuration, together with an image of the display of the control interface for controlling the movement of the outer region.
Figure 3A:
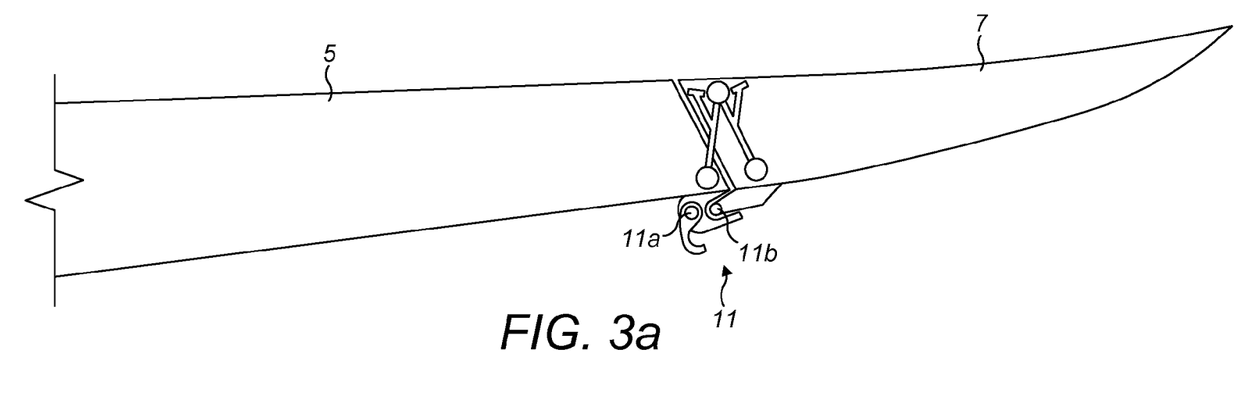
FIGS. 3a-3c show the outer region of FIG. 2 moving between the flight and ground configurations, together with an image of the display of the control interface.
Figure 3B:
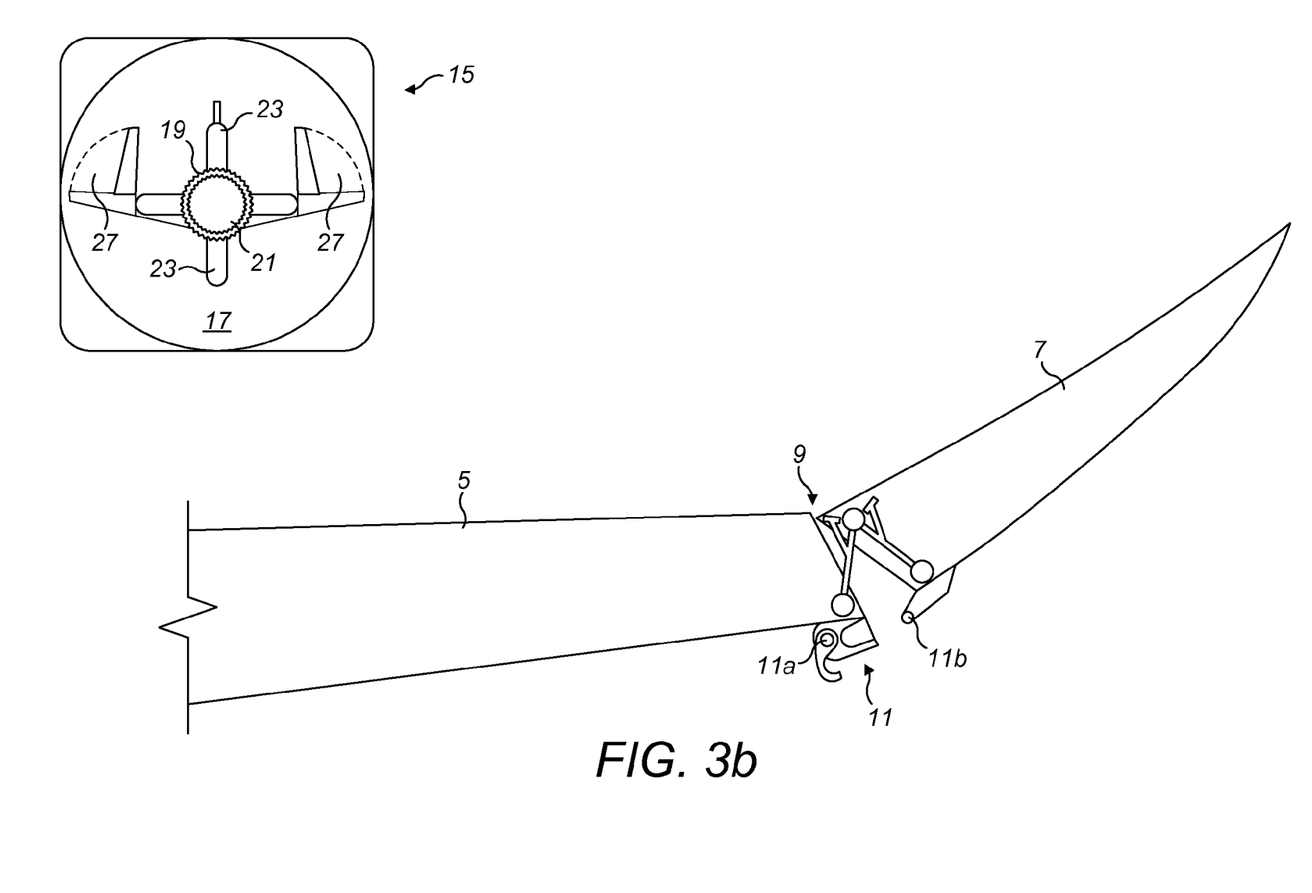
Figure 3C:
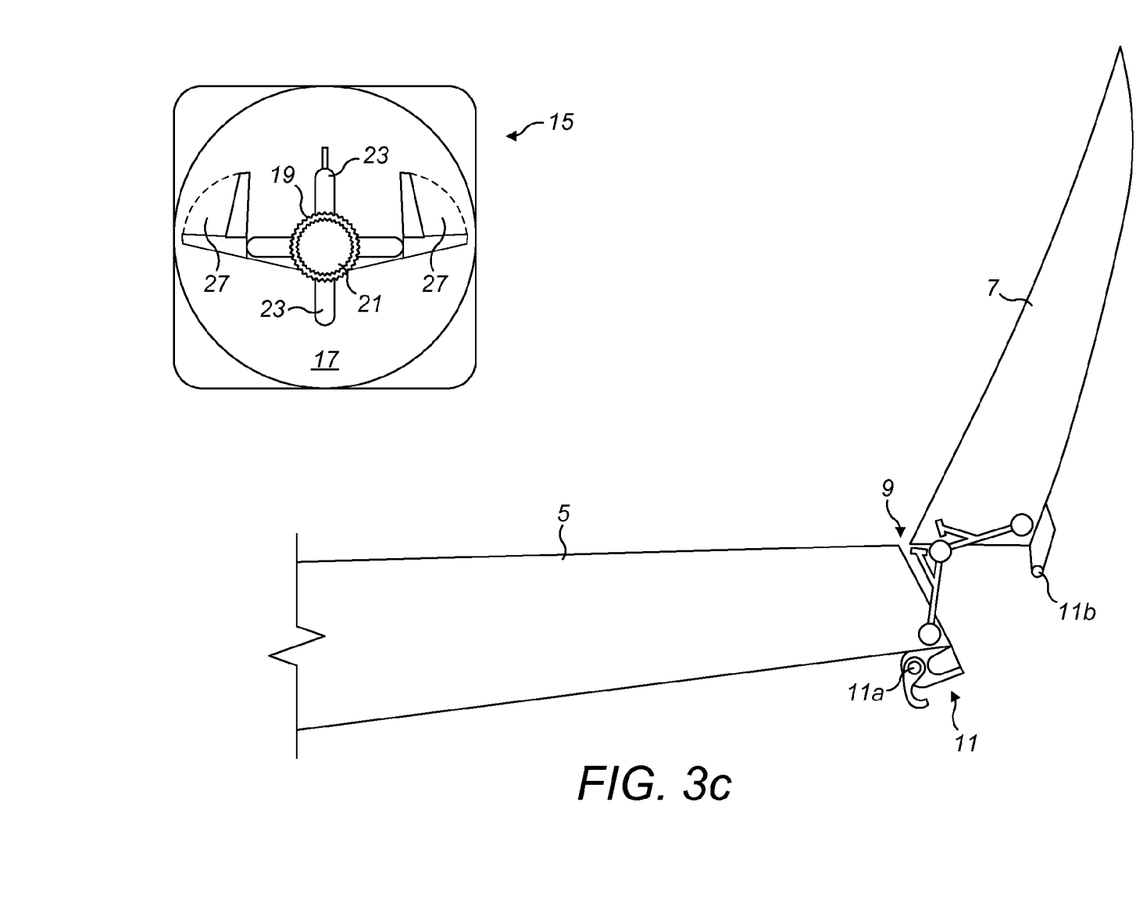
Figure 4:
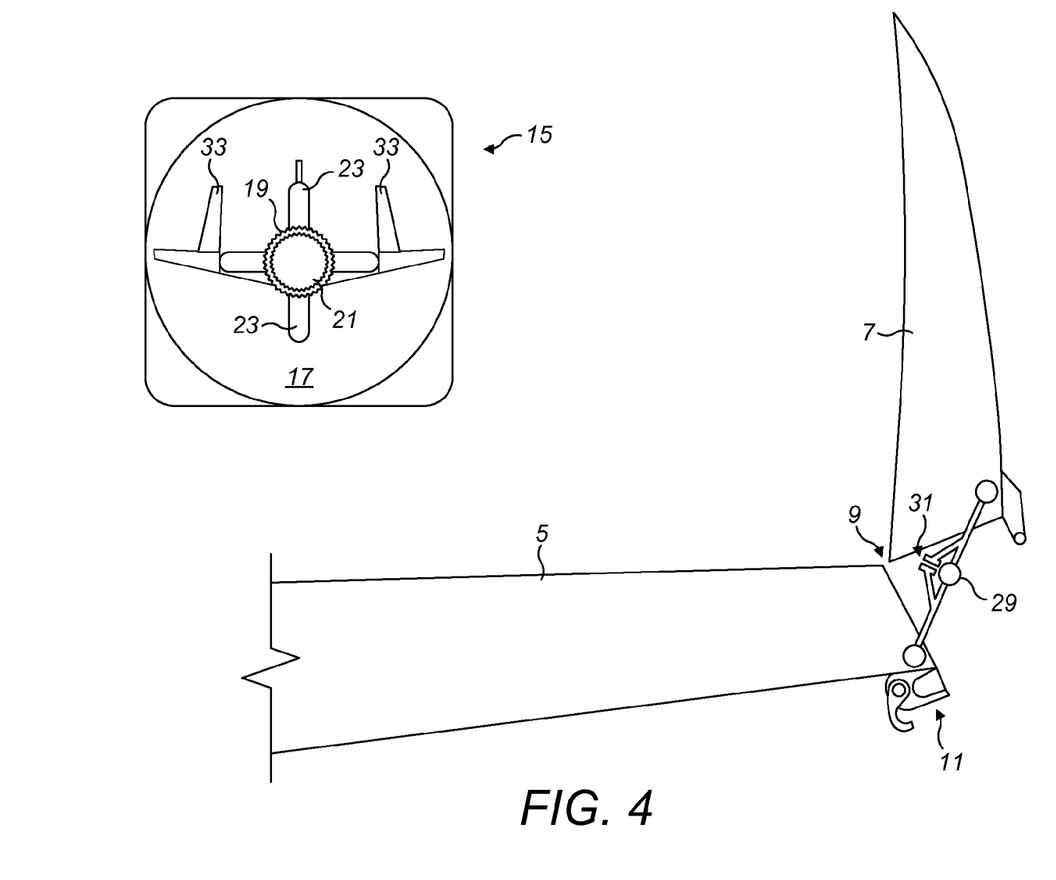
FIG. 4 shows the outer region of FIG. 2 in a ground configuration, together with an image of the display of the control interface.

The selector 19 is rotatable about a central spindle between the orientation shown in FIGS. 2 and 5a-c in which the tabs 23 are horizontally extending and the orientation shown in FIGS. 3a to 4, in which the tabs 23 are vertically extending. A vertical orientation of the tabs 23 represents a selection of the wing tip extensions 7 into the ground configuration, whereas a horizontal orientation of the tabs 23 represents a selection of the wing tip extensions 7 into the flight configuration. Since the orientation of the tabs is broadly representative of the physical orientation of the wing tip extensions 7 in these respective positions, this has been found by users to be a particularly intuitive manner to arrange the selector 19 for case of operation. The selector 19 has a plurality of detents surrounding the spindle (not shown) such that there is tactile feedback to the pilot when rotating the selector 19. Furthermore, the selector 19 is biased into the orientations for ground and flight configurations such that the selector provides positive feedback when either of these are selected.

For the avoidance of doubt, the control 15 interface is shown in FIGS. 2 to 5c as being adjacent to the inner and outer regions of the wing purely to demonstrate the control interface 15 during respective configurations of the wing/wing tip extension. In practice, the control interface is located in the aircraft cockpit. It is positioned in the centre of the cockpit such that the selector 19 is accessible by the pilot and co-pilot and such that the display 17 is within the line-of-sight of the pilots.

In the first embodiment of the invention, the control interface 15 is arranged to provide three different output signals depending on both the actual configuration of the wing tip extensions 7, and on the selected configuration. By having the interface arranged to provide these three different outputs, a pilot can easily identify the status of the outer region and this is thought to convey the key information in a particularly straightforward and intuitive manner.

In FIG. 2, the wing tip extension 7 is in the flight configuration. The wing tip extension 7 is in a flight position in which it forms a smooth junction with the inner region 5 of the wing 3, and the leading and trailing edges of the wing tip extension 7 are continuations of the leading and trailing edges of the inner region. The wing tip extension 7 acts to extend the span of the aircraft. A first locking mechanism 11 (typically referred to as a flight lock) is located on the underside of the wing and comprises a latch 11a coupled to the inner region 5 of the wing 3, for engaging a pin 11b coupled to the wing tip extension 7. The locking mechanism 11 is arranged to lock the wing tip extension 7 in this flight position. The lock-sensing system 45 (shown in FIG. 6) is arranged to sense when the wing tip extension 7 is locked in this position by sensing both the movement of both the latch 11a, and its engagement with the pin 11b. In response to an output from the lock-sensing system 45 that the wing tip is locked, the control system 13 determines that the wing tip extension 7 is correctly in the flight configuration.

Referring now to the interface 15 in FIG. 2, it will be seen that the selector 19 on the control interface 15 has selected the flight configuration (tabs 23 horizontal). In the first embodiment of the invention, when the selector 19 has selected the flight configuration and the control system 13 has determined that the wing tip extension 7 is locked in the correct position, the control interface 15 is arranged to output a first signal. This first signal is in the form of a green light to illuminate the graphical representation 25 of the wing tip extension 7. The pilot therefore receives a clear signal that the wing tip extension 7 is in correctly in the configuration he selected and is ready for flight. Since this flight configuration is adopted throughout the flight, the first signal (green light) is not continuously shown—the signal is removed after a period of time (the absence of any signal meaning that nothing has changed and the wing tip extension is still correctly configured).

After landing, the pilot may wish to configure the wing tip extension 7 in the ground configuration. This process is shown in FIGS. 3a-c, to which reference is now made. The selector 19 is rotated counter-clockwise such that the tabs 23 are vertically orientated; this corresponds to a selection of the ground configuration. The wing tip extension 7 is initially still in the flight position however. Thus, since the wing tip extension 7 is no longer in the selected configuration, the control interface 15 outputs a different signal, namely a red flashing light. The red light is shown in an illuminated sector 27 of the display beneath a representation of a wing tip shown in the ground configuration. The control interface 15 also outputs an audio signal in the form of a repeating audio warning. The pilot therefore receives a clear indication that the wing tip extension 7 is in not in the selected configuration.

In moving from the flight configuration to the ground configuration the locking mechanism 11 first unlatches the latch 11a from the pin 11b (the lock-sensing system will now detect that the wing tip extension 7 is unlocked). An actuator (not shown), then effects upward rotation of the wing tip extension 7 about the hinge 9. This movement is shown in FIGS. 3a-3c. Throughout the movement the red flashing light continues to be shown on the control interface 15.

The wing tip extension 7 is rotated until it reaches its position for the ground configuration shown in FIG. 4 (namely substantially upright). As the skilled person will readily identify, when the wing tip extension 7 is in the ground configuration, it is unsuitable for flight (although in some other embodiments of the invention, the ground configuration may be such that it is possible to make restricted (e.g. ferry) flights). In this position, a linkage mechanism 29 has unfolded to form a rigid strut, which is locked in position by a lock 31 (typically referred to as a ground lock). An example linkage and lock is shown in FIGS. 2 to 5c; however it will be appreciated that many different locks are possible. The lock-sensing system detects that the wing tip extension 7 is locked in this position. The lock-sensing system detects two criteria being met, namely both the movement of a latch (not shown) and its engagement with a latch-engaging member (not shown). When, and only when, these two criteria have been met does the system recognise that the wing tip extension 7 is locked in position in the ground configuration.

When, and only when, the selector 19 has selected the ground configuration and the control system 13 has determined that the wing tip extension 7 is locked in the correct ground position, the control interface 15 is arranged to output a further signal 33. This further signal 33 is in the form of an amber light illuminating the graphical representation of the upright wing tips on the display. The pilot therefore receives a clear signal that the wing tip extension 7 is in the selected configuration (because the red flashing light has stopped) and furthermore that it is in the ground configuration (because of the amber light rather than the green light).

Figure 5A:
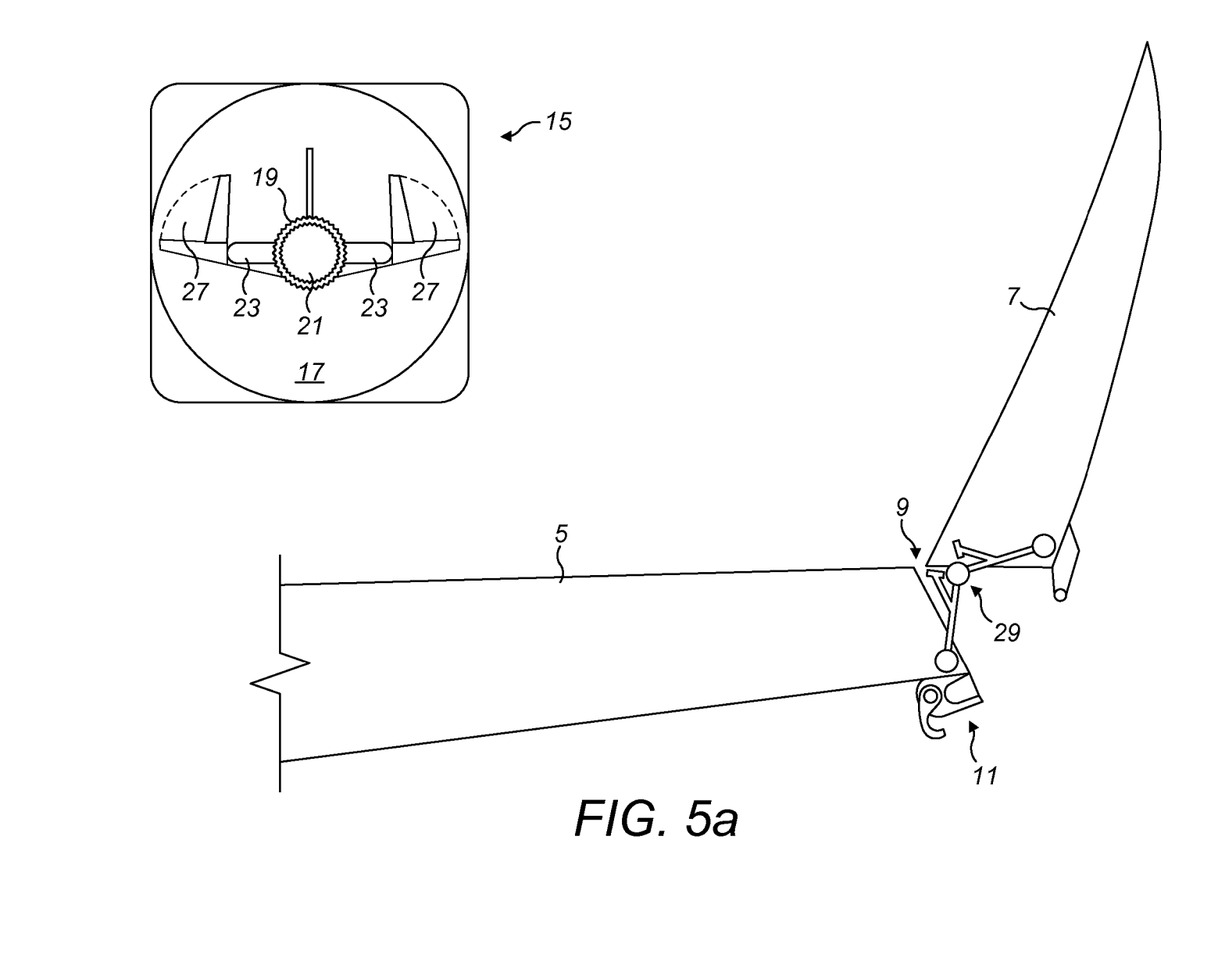
FIGS. 5a-5c show the outer region of FIG. 2 moving between the ground and flight configurations, together with an image of the display of the control interface.
Figure 5B:
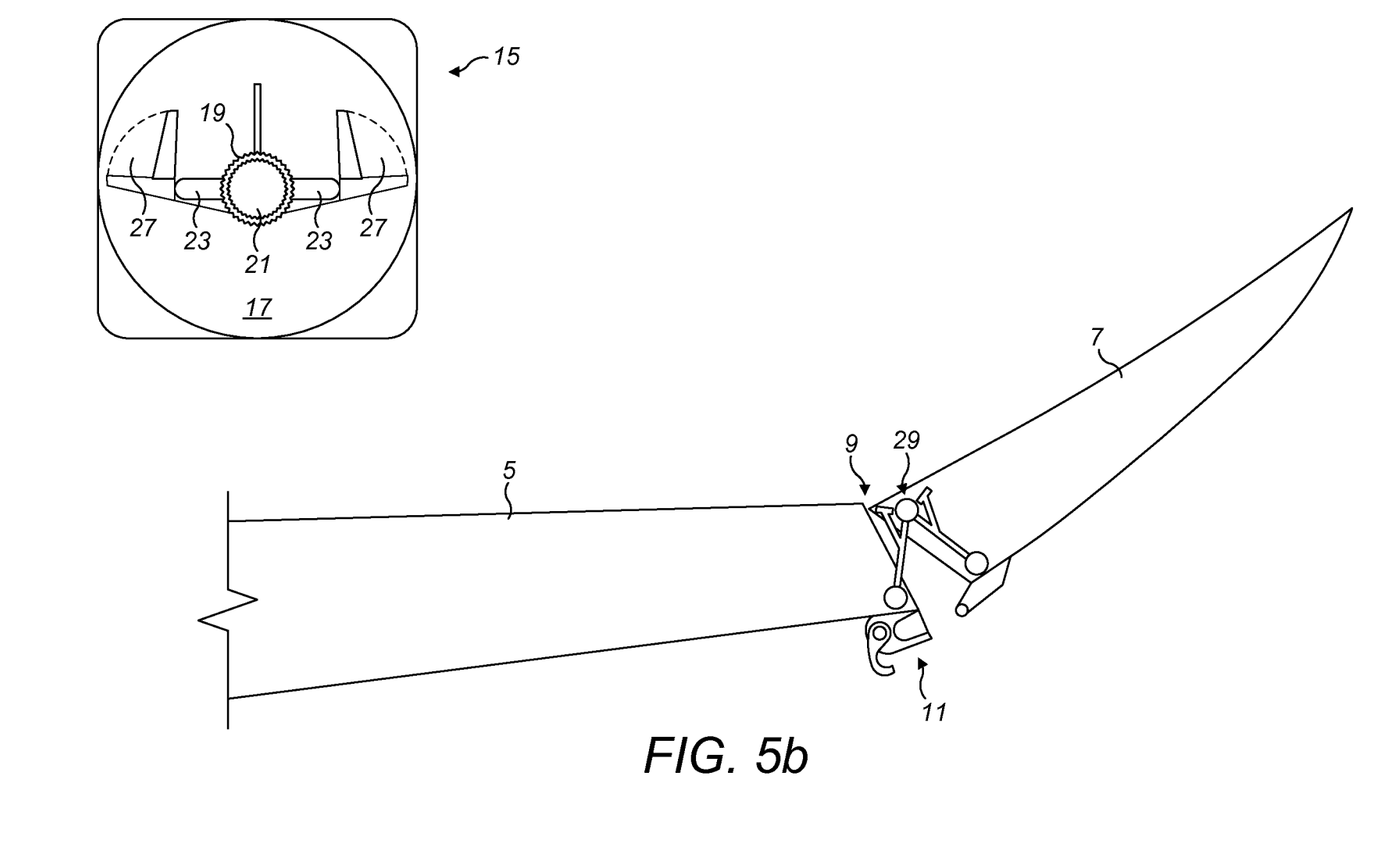
Figure 5C:
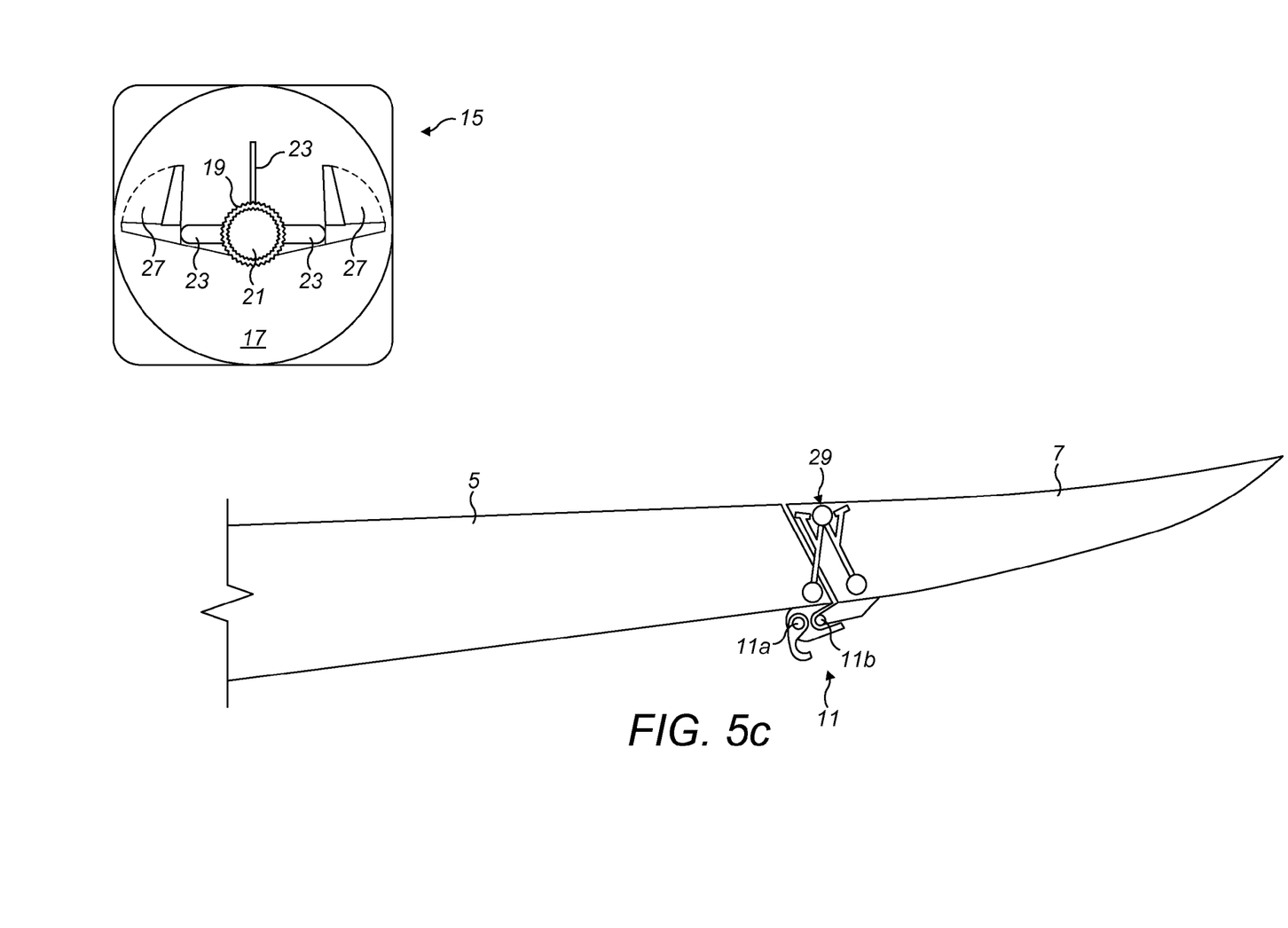

FIGS. 5a to 5c show the wing tip extension 7 being lowered from the ground configuration towards the flight configuration. The pilot rotates the selector 19 clockwise such that the tabs 23 are horizontal. As soon as the selector 19 is selecting a different configuration to the configuration detected by the lock-sensing system, the interface outputs the red flashing light 27 and the audio signal again. The pilot therefore receives a clear indication that the wing tip extension 7 is once again not in the selected configuration.

After the arrangement shown in FIG. 5c, the wing tip extension 7 continues moving until it re-adopts the flight position and the latch 11a latches onto the pin 11b, to form the lock 11. At this point the wing tip extension 7 has re-adopted the flight configuration shown in FIG. 2.

Figure 6:
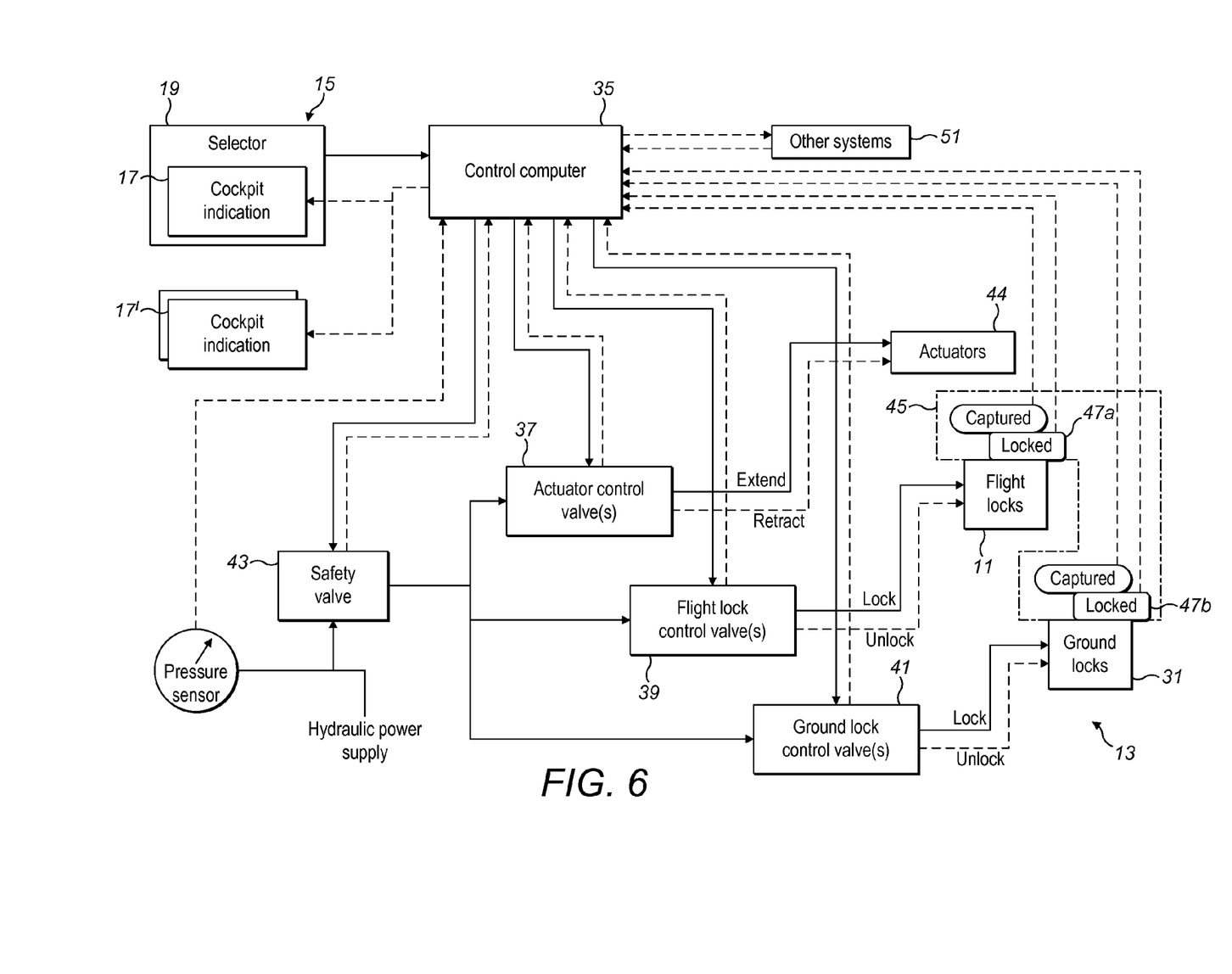
FIG. 6 is a schematic of the control system in the aircraft of FIG. 1, the control system being arranged to control movement of the outer region between the flight configuration and the ground configuration.

FIG. 6 is a schematic view of the control system 13 in the aircraft 1 of the first embodiment of the invention. The control system 13 comprises a control computer 35, actuator control valves 37, flight lock control valves 39, ground lock control valves 41 and safety valve 43. The control computer 35 is configured to control operation of these valves 37-43 (indicated by the solid, medium thickness, arrows in FIG. 6), which in turn respectively enable movement of the actuators 44 for moving the wing tip extension 7, the flight lock 11 for locking the wing tip extension 7 in position in the flight configuration, and the ground lock 31 for locking the wing tip extension 7 in position in the ground configuration. The safety valve 43 is arranged to isolate the hydraulic power supply (indicated by the solid, thick, arrows in FIG. 6) to each of the above-mentioned valves during flight, such that any spurious command signals and/or hydraulic spikes cannot move/unlock the wing tip.

The lock-sensing system 45 is shown in FIG. 6 within the dot-dash-lined box. The lock-sensing system 45 comprises two sets of sensors 47a, 47b for sensing when the wing tip extension 7 is locked in the positions for the flight and ground configurations respectively. Each set of sensors 47a, 47b comprises sensors for sensing the movement of the respective latch (labelled "Locked" in FIG. 6) and sensors for sensing the engagement of the latch with the respective pin (labelled "Captured" in FIG. 6).

The lock-sensing system 45, other systems 51 and the valves 37-43, all provide feedback (shown by the dashed arrows in FIG. 6) to the control computer 35.

The control interface 15 interfaces with the control computer 35 and sends control signals dependent on the position of the selector 19. If appropriate the control system 13 controls the valves in response to those control signals. The control computer 35 also provides feedback (including lock status feedback) to a receiver (not shown in FIG. 6) in the control interface 15. As explained with reference to FIGS. 2 to 5c, the display 17 of the control interface 15 is then arranged to provide the three different signals (green light, red-flashing light+audio, and amber lights) in dependence on the relationship between the selected configuration and the actual configuration.

As shown in FIG. 6 the interface also comprises a duplicate display 17'. This duplicate display 17' displays the same information as the control interface 15 located in the centre of the cockpit but to another location in the aircraft (for example adjacent the co-pilot so that he can more easily monitor the status of the wing tips extension 7).

Figure 7:
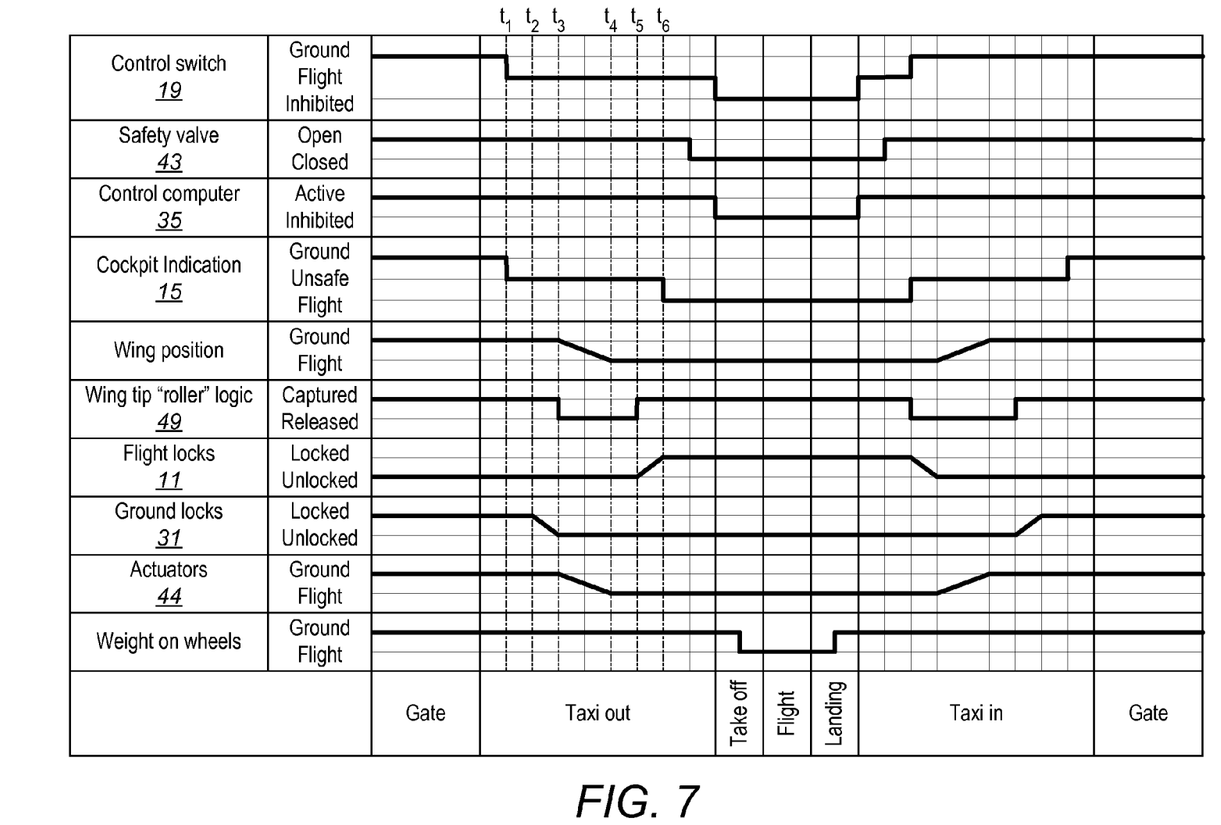
FIG. 7 is a chart showing the operation of various parts of the control system in FIG. 6 during movement from the ground-to-flight-and-back-to-ground configuration.

FIG. 7 is a chart showing the operation of various parts of the control system 13 and control interface 15 in FIG. 6 during movement from the ground to flight, and back to ground, configurations. To begin with the selector 15 (labelled "control switch" in FIG. 7) has selected the ground configuration, and the wing tip extension 7 is in that configuration. The display 17 (labelled "cockpit indication" in FIG. 7) therefore outputs an amber light (labelled "ground" in FIG. 7).

At time $t_1$ the selector 19 is moved to select the flight configuration. Since the wing tip extension 7 is no longer in the selected position (it still being in the ground configuration) the display 17 outputs red-flashing light and audio warning signals (labelled "unsafe" in FIG. 7). At time $t_2$, the ground lock 31, that had been locking the wing tip extension in the ground configuration, begins to unlock.

A wing tip "roller" logic circuit 49 is arranged to measure when the ground and flight locks have actually formed a lock (for example in the case of the flight lock, that the latch 11a has captured the pin 11b). At time $t_3$, once the ground lock 31 is unlocked the wing tip "roller" logic circuit 49 switches to "released" to reflect this change. From time $t_3$ to $t_4$, the actuators 44 move the wing tip extension 7 from the ground position down to the flight position. At time $t_5$ the flight lock 11 starts to lock the wing tip extension 7 in the flight position and once the latch 11a has captured the pin 11b, the "roller" logic circuit 49 switches to "captured". At time $t_6$ the wing tip extension 7 is locked. Thus, at time $t_6$ the wing 3 is locked in the flight configuration, which is the same as the selected position. The display 17 therefore outputs a green light (labelled "flight" in FIG. 7)

After $t_6$ the safety valve 43 is closed to cut off hydraulic power to the actuators 44 and locks 11, 31 and prevent actuation of the wing tip away from the flight configuration. Selector 19 and control computer 35 are also inhibited to prevent accidental use. The system remains in this configuration during the remainder of taxiing out, take-off, flight, and landing. During taxiing in, the above-mentioned process is reversed.

It will be appreciated from the above, that the embodiment of the invention, provides an intuitive and ergonomic interface for controlling the folding of the aircraft wing tips. Whilst the present invention has been described and illustrated with reference to a particular embodiment, it will be appreciated by those of ordinary skill in the art that the invention lends itself to many different variations not specifically illustrated herein. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An aircraft comprising a foldable wing, the wing comprising an inner region and an outer region, the outer region being moveable relative to the inner region between:
    a) a flight configuration for use during flight, and
    b) a ground configuration for use during ground-based operations, in which ground configuration the outer region is moved relative to the inner region such that the span of the wing is reduced, wherein the aircraft further comprises a control system arranged to control movement of the outer region between the flight configuration and the ground configuration, and a control interface for interfacing with the control system, the control interface comprising a selector for selecting the desired configuration of the outer region, and the control interface being arrange to provide:

a first output when the flight configuration is selected and the outer region is in the flight configuration;

a second output when the ground configuration is selected and the outer region is in the ground configuration; and a third output when the outer region is not in the selected configuration.

2. An aircraft according to claim 1, wherein the control interface further comprises a display for indicating the status of the outer region, and wherein the control interface is configured such that the display shows:

the first output as a first indicating signal; and the second output as a second indicating signal.

3. An aircraft according to claim 2, wherein the first indicating signal is a light having a first colour and the second indicating signal is a light having a second colour.

4. An aircraft according to claim 2, wherein the control interface is configured such that the display shows the third output as a third indicating signal.

5. An aircraft according to claim 4, wherein the third indicating signal is a light having a third colour.

6. An aircraft according to claim 5, wherein the third indicating signal is a flashing signal.

7. An aircraft according to claim 1, wherein the first, second and/or third outputs comprise an audio signal, and wherein the audio signal is provided in response to an additional criteria being met, the additional criteria being representative of a forthcoming need to be in the flight and/or ground configuration.

8. An aircraft according to claim 1, wherein the control interface is in the aircraft cockpit, and the interface is located such that a pilot in the cockpit can effect movement of the selector to select the desired configuration of the outer region.

9. An aircraft according to claim 2, wherein the control interface is in the aircraft cockpit, and the interface is located such that a pilot in the cockpit can effect movement of the selector to select the desired configuration of the outer region, and wherein the display is located in the line-of-sight of the pilot.

10. An aircraft according to claim 1, wherein in the flight configuration, the outer region is locked in position by a flight lock.

11. An aircraft according to claim 10, wherein the control system comprises a lock-sensing system, the lock-sensing system being arranged to sense when the outer region is locked in position by the flight lock.

12. An aircraft according to claim 11, wherein the control interface is arranged to provide the first output in response to the lock sensing system sensing that the outer region is locked in position by the flight lock.

13. An aircraft according to claim 12, wherein in the ground configuration, the outer region is locked in position by a ground lock and wherein the lock-sensing system is arranged to sense when the outer region is locked in position by the ground lock.

14. An aircraft according to claim 13, wherein the control interface is arranged to provide the second output in response to the lock sensing system sensing when the outer region is locked in position by the ground lock.

15. An aircraft according to claim 1, wherein the selector is moveable in a first direction to select the ground configuration, and moveable in a second direction, preferably opposite to the first direction, to select the flight configuration.

16. An aircraft according to claim 15, wherein the first direction is representative of the direction of movement of the outer region when moving from the flight configuration to the ground configuration.

17. An aircraft according to claim 16 wherein the selector is arranged to provide tactile feedback to indicate the selection of the ground and flight configurations.

18. An aircraft according to claim 15 wherein the selector comprises protrusions representative of the outer regions of the aircraft wings, the orientation of the protrusions when the selector has selected the flight configuration being representative of the orientation of the outer region in the flight configuration, and the orientation of the protrusions when the selector has selected the ground configuration being representative of the orientation of the outer region in the ground configuration.

19. A control interface for interfacing with a control system for controlling movement of a foldable wing, wherein the foldable wing comprises an inner region and an outer region, the outer region being moveable relative to the inner region between:

a) a flight configuration for use during flight, and b) a ground configuration for use during ground-based operations, in which ground configuration the outer region is rotated relative to the inner region such that the span of the wing is reduced, and wherein the control interface comprises a selector for selecting the desired configuration of the outer region, and the control interface is arrange to provide:

a first output when the flight configuration is selected and the outer region is in the flight configuration;

a second output when the ground configuration is selected and the outer region is in the ground configuration; and a third output when the outer region is not in the selected configuration.

20. A control interface according to claim 19, wherein the control system comprises a lock-sensing system for sensing whether the outer region is locked in position, and wherein the control interface comprises a receiver for receiving signals from the lock-sensing system.

21. A control interface according to claim 20 wherein the interface is arranged to provide the first output in response to the receiver receiving a signal from the lock-sensing system indicative of the outer region being locked in position by a flight lock.

22. A control interface according to claim 21, wherein the interface is arranged to provide the second output in response to the receiver receiving a signal from the lock-sensing system indicative of the outer region being locked in position by a ground lock.

23. A control interface for interfacing with a control system for controlling movement of a foldable wing, wherein the foldable wing comprises an inner region and a wing tip, the wing tip being moveable relative to the inner region between:

a) a flight configuration for use during flight, and b) a ground configuration for use during ground-based operations, in which ground configuration the wing tip is rotated relative to the inner region such that the span of the wing is reduced, and wherein the control interface comprises a selector for rotating to select the desired configuration of the wing tip, and the control interface is arrange to provide:

a display showing a representation of the aircraft wing and the configuration of the wing tip, an illuminated signal of a first colour on the display when the flight configuration is selected and the outer region is in the flight configuration;

an illuminated signal of a second colour on the display when the ground configuration is selected and the outer region is in the ground configuration; and a flashing illuminated signal of a third colour on the display when the outer region is not in the selected configuration.

\* \* \* \* \*